(12) United States Patent
Jendbro et al.

(10) Patent No.: US 7,945,251 B2
(45) Date of Patent: May 17, 2011

(54) LOCATING A SERVICE DEVICE FOR A PORTABLE COMMUNICATION DEVICE

(75) Inventors: Magnus Jendbro, Staffanstorp (SE); William O. Camp, Jr., Chapel Hill, NC (US); Brett A. Pantalone, Pittsboro, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1370 days.

(21) Appl. No.: 11/424,677

(22) Filed: Jun. 16, 2006

(65) Prior Publication Data
US 2007/0224975 A1 Sep. 27, 2007

Related U.S. Application Data

(60) Provisional application No. 60/786,019, filed on Mar. 27, 2006.

(51) Int. Cl.
*H04M 3/42* (2006.01)
*H04M 1/00* (2006.01)
*H04W 24/00* (2009.01)
*H04W 68/00* (2009.01)
*H04W 4/00* (2009.01)

(52) U.S. Cl. ............... 455/414.1; 455/456.1; 455/458; 455/466; 455/552.1; 370/252; 370/328; 370/346; 370/352; 370/399; 379/93.02; 379/201.01; 340/573.1; 703/21; 709/224; 709/203; 709/219; 709/220; 709/226; 710/7; 710/48

(58) Field of Classification Search ............... 455/414.1, 455/458, 466, 552.1, 456.1; 370/346, 352, 370/399, 252, 328, 458; 340/573.1; 705/14; 709/219, 226, 104, 203, 220, 224; 710/48, 7; 379/93.02, 201.01; 703/21

See application file for complete search history.

(56) References Cited

U.S. PATENT DOCUMENTS

| | | | | | |
|---|---|---|---|---|---|
| 5,519,707 | A | * | 5/1996 | Subramanian et al. | 370/399 |
| 5,526,357 | A | * | 6/1996 | Jandrell | 370/346 |
| 5,566,352 | A | * | 10/1996 | Wishneusky | 710/48 |
| 5,761,618 | A | * | 6/1998 | Lynch et al. | 455/419 |
| 5,764,912 | A | * | 6/1998 | Rosborough | 709/224 |
| 5,781,449 | A | * | 7/1998 | Rosborough | 709/224 |
| 5,799,173 | A | * | 8/1998 | Gossler et al. | 703/21 |
| 5,818,824 | A | * | 10/1998 | Lu et al. | 370/328 |

(Continued)

FOREIGN PATENT DOCUMENTS
EP 0 817 444 A2 1/1998

OTHER PUBLICATIONS

PCT Search Report and Written Opinion, Jan. 19, 2007, 12 pages.

(Continued)

*Primary Examiner* — William D Cumming
(74) *Attorney, Agent, or Firm* — Harrity & Harrity, LLP (57) ABSTRACT

A portable communication device (10) may send a service device locating request (42) including a position associated with the portable communication device to a service device locating device (12). The service device locating device (12) may determine at least one service device located close to the indicated position and respond to the request by sending a response (46) including at least one network identifier of a service device (16) capable of handling the desired service. The portable communication device may then directly contact (48) the service device (16).

27 Claims, 2 Drawing Sheets

U.S. PATENT DOCUMENTS

| | | | |
|---|---|---|---|
| 5,838,920 A * | 11/1998 | Rosborough | 709/224 |
| 5,920,571 A * | 7/1999 | Houck et al. | 370/458 |
| 6,201,860 B1 * | 3/2001 | Kullstrom et al. | 379/201.01 |
| 6,205,154 B1 * | 3/2001 | Schmidt et al. | 370/458 |
| 6,205,477 B1 * | 3/2001 | Johnson et al. | 709/220 |
| 6,535,743 B1 * | 3/2003 | Kennedy et al. | 455/456.1 |
| 6,539,396 B1 * | 3/2003 | Bowman-Amuah | 707/769 |
| 6,678,750 B2 * | 1/2004 | Meade et al. | 710/7 |
| 6,883,028 B1 * | 4/2005 | Johnson et al. | 709/226 |
| 6,914,897 B1 * | 7/2005 | Schuster et al. | 370/352 |
| 6,996,410 B2 * | 2/2006 | Bos et al. | 455/466 |
| 6,996,614 B2 * | 2/2006 | Hallinan et al. | 709/226 |
| 7,394,386 B2 * | 7/2008 | Nowlan | 340/573.1 |
| 7,701,872 B2 * | 4/2010 | Islam et al. | 370/254 |
| 2001/0029519 A1 * | 10/2001 | Hallinan et al. | 709/104 |
| 2002/0046139 A1 * | 4/2002 | Ozaki et al. | 705/27 |
| 2002/0184304 A1 * | 12/2002 | Meade et al. | 709/203 |
| 2004/0083307 A1 | 4/2004 | Uysal | |
| 2004/0087319 A1 * | 5/2004 | Bos et al. | 455/458 |
| 2005/0195757 A1 * | 9/2005 | Kidder et al. | 370/278 |
| 2006/0104211 A1 * | 5/2006 | Islam et al. | 370/252 |
| 2007/0067385 A1 * | 3/2007 | D'Angelo et al. | 709/203 |
| 2007/0133763 A1 * | 6/2007 | D'Angelo et al. | 379/93.02 |
| 2007/0224975 A1 * | 9/2007 | Jendbro et al. | 455/414.1 |
| 2008/0032736 A1 * | 2/2008 | Bari et al. | 455/552.1 |
| 2008/0141015 A1 * | 6/2008 | Chalemin et al. | 713/2 |
| 2009/0030792 A1 * | 1/2009 | Khivesara et al. | 705/14 |
| 2009/0068996 A1 * | 3/2009 | Bakker et al. | 455/414.1 |
| 2009/0204688 A1 * | 8/2009 | Britton et al. | 709/219 |
| 2010/0211993 A1 * | 8/2010 | Islam et al. | 726/3 |

OTHER PUBLICATIONS

E. Guttman, et al., "RFC 2608—Service Location Protocol, Version 2", Internet Citation, Jun. 1999, pp. 1-54.

* cited by examiner

| SERVICE DEVICE | POS | ADR |
|---|---|---|
| PR1 | X1,Y1,Z1 | 192.168.100.1 |
| PR2 | X2,Y2,Z2 | 192.168.100.2 |
| ST1 | X3,Y3,Z3 | 192.168.100.3 |
| ST2 | X4,Y4,Z4 | 192.168.100.4 |
| PRO | X5.Y5.Z5 | 192.168.100.5 |

LOCATING A SERVICE DEVICE FOR A PORTABLE COMMUNICATION DEVICE

RELATED APPLICATION

This application claims priority under 35 U.S.C. §119 based on U.S. Provisional Application Ser. No. 60/786,019, filed Mar. 27, 2006, the disclosure of which is incorporated herein by reference.

TECHNICAL FIELD OF THE INVENTION

The present invention relates to the location of service devices from a portable communication device. More particularly, the present invention relates to a method, a portable communication device and a computer program product for obtaining a network identifier of a serving device for a portable communication device. It also relates to a method, a service device locating device and a computer program product for providing a network identifier of a serving device to a portable communication device.

DESCRIPTION OF RELATED ART

Portable communication devices, such as cellular phones and lap tops have more and more functionalities, like the ability to play music, provide slide show presentations, create and edit documents, present video, etc. The portable communication devices are furthermore getting smaller and smaller. Displays and sound reproducing units are getting smaller. There is, therefore, an increasing need to be able to connect the portable communication device to a service device in order to take full advantage of a function provided in the portable communication device. It might for instance be desirable to connect to a projector in order to present a slide show, to connect to a printer in order to print out a document or to connect to a stereo or video device in order to render a media stream. However, at the present time, it is not so easy for a user of a portable communication device to locate such a service device that he is interested in using. Some methods do exist for locating services on a local network. However, the service located might then be provided far away from the user and not be provided as close to the portable communication device as the user wishes.

There is thus a need for allowing a user of a portable communication device to be able to locate such a service device in a location that is as close as possible to a position associated with the portable communication device.

SUMMARY OF THE INVENTION

Aspects of the invention are directed towards allowing a user of a portable communication device to be able to locate a service device that is as close as possible to a position associated with the portable communication device.

Some aspects provide a method that allows a user of a portable communication device to be able to locate a service device that is as close as possible to a position associated with the portable communication device.

According to a first aspect of the invention, this is achieved by a method of obtaining a network identifier of a serving device for a portable communication device, in order to obtain a desired service according to a certain type from the serving device. The method comprises the steps of sending, from the portable communication device, a service device locating request including a position or location associated with the portable communication device, and receiving at least one response including at least one network identifier of a service device capable of handling the desired service, where the service device is selected based on its physical proximity to the location of the portable communication device.

A second aspect of the present invention includes the steps of the first aspect, further comprising the step of contacting the service device using the network identifier for obtaining service.

A third aspect of the invention includes the steps of the first aspect, wherein the service request includes a type of service indication.

A fourth aspect of the invention includes the steps of the third aspect, wherein the type of service indication is provided through indicating or providing an object to be handled by the service.

A fifth aspect of the invention includes the steps of the third aspect, wherein the type of service indication is provided through naming the desired service.

A sixth aspect of the invention includes the steps of the fifth aspect, wherein the service request is a name query, including the position where the name of the query is the desired service.

A seventh aspect of the invention includes the steps of the first aspect, wherein the at least one response provides more than one network identifier and types of services provided through each network identifier, where each network identifier is associated with a service device that provides a different type of service and is closest to the location of the portable communication device, and further comprising the step of selecting network identifier of the service device providing the desired service to be used in contacting this service device.

An eighth aspect of the invention includes the features of the seventh aspect, wherein there is a single response providing a list of network identifiers and corresponding services.

A ninth aspect of the invention includes the features of the first aspect, wherein the position is a current location of the portable communication device.

A tenth aspect of the invention includes the features of the first aspect, wherein the location is a future expected position of the portable communication device.

An eleventh aspect of the invention includes the features of the first aspect, wherein the service request is sent periodically from the portable communication device. This feature allows the portable communication device to always locate a nearest service device as it moves throughout a network.

A twelfth aspect of the invention includes the features of the first aspect, further comprising the step of determining the location associated with the portable communication device to be used for sending a service device locating request.

Other aspects of the invention provide a portable communication device that allows a user of this portable communication device to be able to locate a service device that is as close as possible to a position associated with the portable communication device.

According to a thirteenth aspect of the invention this is achieved by a portable communication device provided for obtaining a network identifier of a serving device for the portable communication device in order to obtain a desired service according to a certain type from the serving device. The portable communication devices comprises: at least one radio communication unit, and a control unit arranged to, provide a service device locating request including a position associated with the portable communication device, order the radio communication unit to send said service device locating request, and, receive at least one response including at least one network identifier of a service device capable of handling the desired service, where the service device is physically closer to the location of the portable communication device than other service devices capable of handling the desired service.

A fourteenth aspect of the invention includes the features of the thirteenth aspect, wherein said control unit is further arranged to order the radio communication unit to contact the service device using the network identifier for obtaining service.

A fifteenth aspect of the invention includes the features of the thirteenth aspect, wherein the service request includes a type of service indication.

A sixteenth aspect of the invention includes the features of the fifteenth aspect, wherein the type of service indication is provided through indicating or providing an object to be handled by the service.

A seventeenth aspect of the invention includes the features of the fifteenth aspect, wherein the type of service indication is provided through naming the desired service.

An eighteenth aspect of the invention includes the features of the seventeenth aspect, wherein the service request is a name query including the position and where the name of the query is the desired service.

A nineteenth aspect of the invention includes the features of the thirteenth aspect, wherein the at least one response provides more than one network identifier and types of services provided through each network identifier, where each network identifier is associated with a service device that provides a different type of service and that is closest to the location of the portable communication device with respect to other service devices, and the control unit is further arranged to select network identifier of the service device providing the desired service to be used in contacting this service device.

A twentieth aspect of the invention includes the features of the nineteenth aspect, wherein there is a single response providing a list of network identifiers and corresponding services.

A twenty-first aspect of the invention includes the features of the thirteenth aspect, further comprising a position obtaining unit arranged to provide said location associated with the portable communication device to the control unit.

A twenty-second aspect of the invention includes the features of the twenty-first aspect, wherein the location is a current position of the portable communication device.

A twenty-third aspect of the invention includes the features of the thirteenth aspect, wherein the position is a future expected position of the portable communication device.

A twenty-fourth aspect of the invention includes the features of the thirteenth aspect, wherein the service request is ordered to be sent periodically from the portable communication device.

A twenty-fifth aspect of the invention includes the features of the thirteenth aspect, the portable communication device comprise a cellular phone.

A twenty-sixth aspect of the invention is directed towards a portable communication device provided for obtaining a network identifier of a serving device for the portable communication device in order to obtain a desired service according to a certain type from the serving device. The portable communication device comprises means for sending, from the portable communication device, a service device locating request including a position associated with the portable communication device, and means for receiving at least one response including at least one network identifier of a service device capable of handling the desired service, where the service device is selected based on its physical proximity to the position of the portable communication device, A twenty-seventh aspect of the invention includes the features of the twenty-sixth aspect, further comprising means for contacting the service device using the network identifier for obtaining service.

A twenty-eighth aspect of the invention includes the features of the twenty-sixth aspect, wherein the at least one response provides more than one network identifier and types of services provided through each network identifier, where each network identifier is associated with a service device that provides a different type of service and that is located closer to the position than other service devices, and further comprising means for selecting network identifier of the service device providing the desired service to be used in contacting this service device.

A twenty-ninth aspect of the invention includes the features of the twenty-sixth aspect, further comprising means for determining the position associated with the portable communication device to be used for sending a service device locating request.

Other aspects of the invention are directed towards providing a computer program product that allows a user of a portable communication device to be able to locate a service device that is as close as possible to a position associated with the portable communication device.

According to a thirtieth aspect of the invention, this is achieved by a computer program product for obtaining a network identifier of a serving device for a portable communication device in order to obtain a desired service according to a certain type from the serving device. The computer program product comprises computer program code for execution by the portable communication device to, when said program code is loaded in the portable communication device, to cause the portable communication device to provide a service device locating request including a position associated with the portable communication device, order a radio communication unit to send said service device locating request, and receive at least one response including at least one network identifier of a service device capable of handling the desired service and that is physically closest to the position of the portable communication device.

Still other aspects of the invention provide a method that allows a user of a portable communication device to be able to locate a service device that is as close as possible to a position associated with the portable communication device.

According to a thirty-first aspect of the invention, this is achieved by a method of providing a network identifier of a serving device to a portable communication device in order to provide a desired service to the portable communication device according to a certain type. The method comprises the steps of receiving, from the portable communication device, a service device locating request including a position associated with the portable communication device, determining at least one service device being close to the indicated position, and sending a response including at least one network identifier of a service device capable of handling the desired service and is physically closer to the position of the portable communication device than other service devices capable of handling the desired service.

A thirty-second aspect of the invention includes the features of the thirty-first aspect, wherein the service request includes a type of service indication, and the step of determining comprises determining a service device handling that type of service being closest to the indicated position.

A thirty-third aspect of the invention includes the features of the thirty-second aspect, wherein the type of service indication is provided through indicating or providing an object to be handled by the service.

A thirty-fourth aspect of the invention includes the features of the thirty-second aspect, wherein the type of service indication is provided through naming the desired service.

A thirty-fifth aspect of the invention includes the features of the thirty-fourth aspect, wherein the service request is a name query including the position, where the name of the query is the desired service.

A thirty-sixth aspect of the invention includes the features of the thirty-first aspect, wherein the step of determining comprises selecting a service device that is within a service area around said position.

Still further aspects of the invention provide a service device locating device that allows a user of a portable communication device to be able to locate a service device that is as close as possible to a position associated with the portable communication device.

According to a thirty-seventh aspect of the invention, this is achieved by a service device locating device providing a network identifier of a serving device to a portable communication device in order to provide a desired service to the portable communication device according to a certain type. The service device locating device comprises: at least one communication unit, and a control unit arranged to receive, from the portable communication device, a service device locating request including a position associated with the portable communication device, determine at least one service device being close to the indicated position, and order the communication unit to send a response including at least one network identifier of a service device capable of handling the desired service, where the service device is physically close to the position of the portable communication device.

A thirty-eighth aspect of the invention includes the features of the thirty-seventh aspect, wherein the service request includes a type of service indication and the determining comprises determining a service device handling that type of service being closest to the indicated position.

A thirty-ninth aspect of the invention includes the features of the thirty-eighth aspect, wherein the type of service indication is provided through indicating or providing an object to be handled by the service.

A fortieth aspect of the invention includes the features of the thirty-eighth aspect, wherein the type of service indication is provided through naming the desired service.

A forty-first aspect of the present invention includes the features of the fortieth aspect, wherein the service request is a name query including the position, where the name of the query is the desired service.

A forty-second aspect of the invention includes the features of the thirty-seventh aspect, wherein the control unit when determining a service device being close is arranged to select a service device that is within a service area around said position.

A forty-third aspect of the invention is directed towards a service device locating device providing a network identifier of a serving device to a portable communication device in order to provide a desired service to the portable communication device according to a certain type. The service device locating device comprises: means for receiving, from the portable communication device, a service device locating request including a position associated with the portable communication device, means for determining at least one service devices being close to the indicated position, and means for sending a response including at least one network identifier of a service device capable of handling the desired service, the service device being physically close to the position of the portable communication device.

Additional aspects of the present invention provide a computer program product that allows a user of a portable communication device to be able to locate a service device that is as close as possible to a position associated with the portable communication device.

According to a forty-fourth aspect of the invention, this is achieved by a computer program product for providing a network identifier of a serving device to a portable communication device in order to provide a desired service to the portable communication device according to a certain type. The computer program code is for execution by a service device locating device, when said program code is loaded in the service device locating device, and causes the service device locating device to receive, from the portable communication device, a service device locating request including a position associated with the portable communication device, determine at least one service device being close to the indicated position, and order a communication unit to send a response including at least one network identifier of a service device capable of handling the desired service based on its closeness to the position of the portable communication device.

Aspects of the invention provide, among other advantages, the following advantages. It lets a user of a portable communication device connect to a service device of his need in a simple way and furthermore connect to the one that is close to him. This saves time and effort for a user of a portable communication device, since there is no need for manual entering of information that is necessary for locating and using a device. There is furthermore no need for the user to walk long distances to see the results of the service.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

Figure 1:
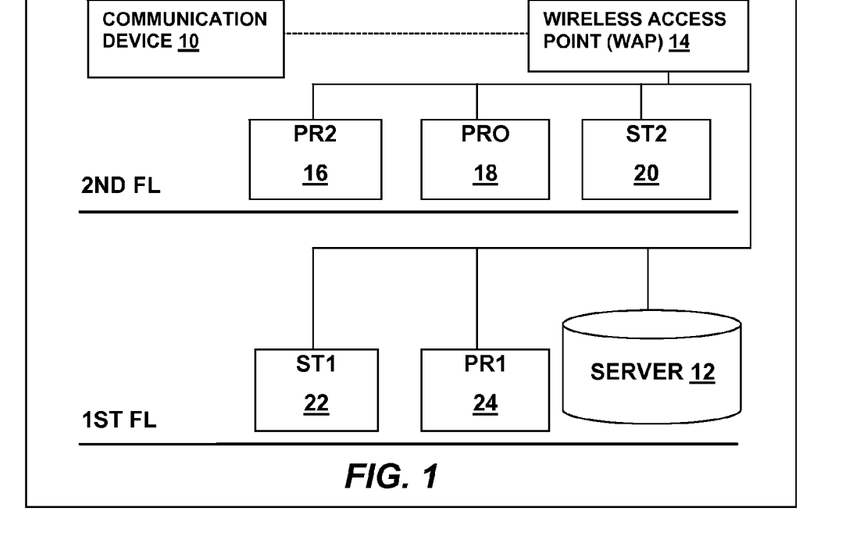
FIG. 1 illustrates an exemplary portable communication device communicating with a local network including a service device locating server.

A portable communication device 10 according to the invention is shown in FIG. 1 connected to a local network via a wireless access point 14. The portable communication device 10 may be any type of portable communication device having one or more applications that might need some type of external service. The portable communication device 10 may for instance be a lap top computer, a palm top computer, a cellular phone, a portable media player, such as a music or video player, a gaming machine, a portable TV or radio receiver, etc. The different types of applications can for instance include a document handling application, a slide creating and presenting application, a music or video playing application or a TV or radio receiving application. For this reason, the local network, which in this embodiment is provided in a building having a first and a second floor FL1 and FL2, is provided with a number of service devices 16, 18, 20, 22 and 24 that the portable communication device 10 may be able to connect to in order to obtain some type of service. The service devices are here a first printer PR1 24 and a first stereo ST1 22 located on the first floor FL1 and a second printer PR2 16, a second stereo ST2 20 and a projector PRO 18 located on the second floor FL2. It should here be realized that these service devices are mere examples of devices that can be provided in the local network and that there may be more or fewer devices of these types as well as devices of other types. The network in this exemplary embodiment may be an Ethernet based LAN network using network identifiers in the form of Internet protocol (IP) addresses for communication. It should however be realized that the network may be any other type of network and may also be a wireless network. Other examples of networks include Bluetooth and universal plug and play (UPnP) networks. In the network there is furthermore provided a service device locating device in the form of a server 12, the functioning of which will be elaborated on shortly.

Figure 2:
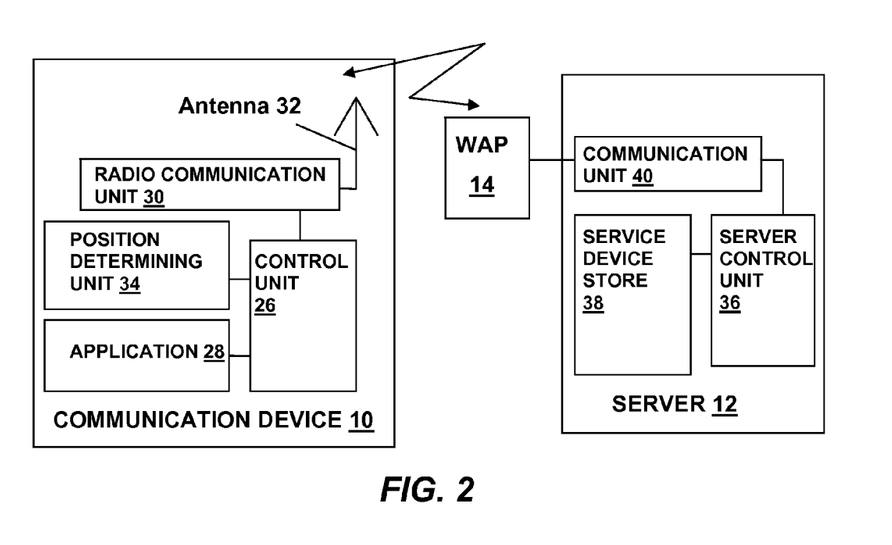
FIG. 2 illustrates a block schematic of exemplary parts of the portable communication device and the service device locating server.

FIG. 2 shows a block schematic of relevant parts of the portable communication device 10 and the service device locating server 12 communicating with each other via the wireless access point 14. For this reason the portable communication device 10 comprises a radio communication unit 30 connected to an antenna 32. The radio communication unit 30 is furthermore connected to a control unit 26, which in turn is connected to a position determining unit 34, which may be a GPS positioning unit as well as to an application 28. The service device locating server 12 includes a communication unit 40 in the form of an Ethernet interface for communicating with other devices of the local network like the wireless access point 14. The communication unit 40 is connected to a server control unit 36, which in turn is connected to a service device store 38.

Figure 3:
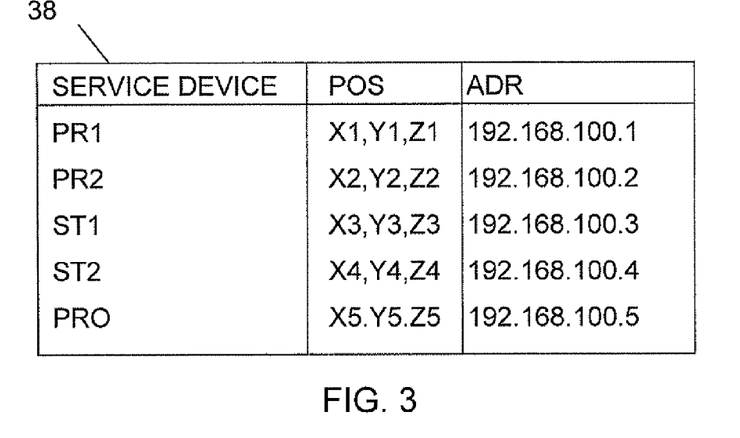
FIG. 3 illustrates the contents of a service device store in the service device locating server.
Figure 4:
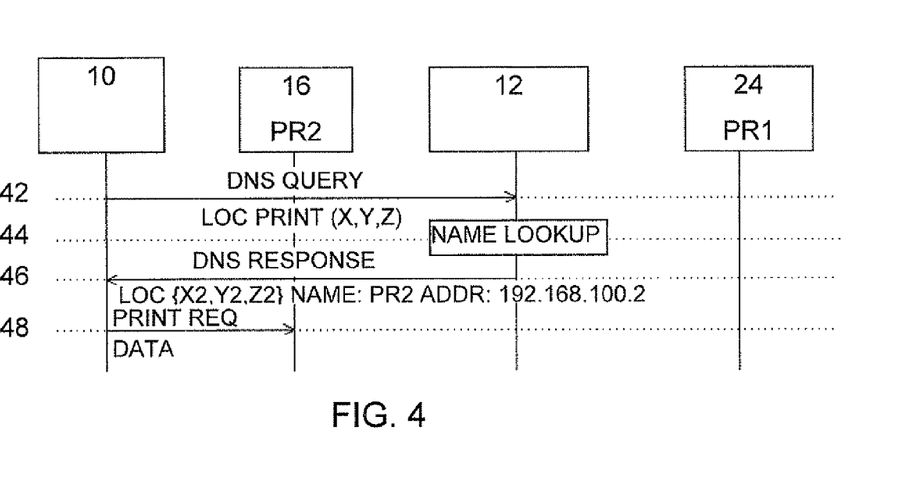
FIG. 4 illustrates exemplary commands and data exchanged between the portable communication device, the service device locating server and a service device.

The contents of the service device store 38 are schematically shown in FIG. 3 in the form of a table. Each service device is listed in the table and for each service device, there is a position (x, y, z) and the network identifier of the device, that is here the IP address. In the present example, the service devices are stationary and therefore their positions are provided once or updated, for example, at times when a service device is moved. Thus the first printer PR1 has a location X1, Y1, Z1 and an address 192.168.100.1, the second printer PR2 has a location X2, Y2, Z2 and an address 192.168.100.2, the first stereo ST1 has a location X3, Y3, Z3 and an address 192.168.100.3, the second stereo ST2 has a location X4, Y4, Z4 and an address 192.168.100.4 and the projector PRO has a location X5, Y5, 75 and an address 192.168.100.5.

As mentioned before, the portable communication device 10 has a number of applications, which all might need some type of service. If for instance the application is a document or text editing application, the user of the device might want to print out the text on a printer. The present invention allows the user to be able to automatically select a service device according to the service wanted. How this might be done will now be explained with reference being made to FIGS. 1, 2, 3 and 4, where the latter shows a number of commands and data sent between the portable communication device 10, the service device locating server 12 and a selected service device that is here, in an example to be given, the second printer PR2 16 in the network.

As the user of the portable communication device 10 for instance wants to print a document he is editing using a text editing application 28, he might be presented with the option to automatically select printer. If he does this, the application 28 connects to the control unit 26, which in turn asks for the position of the device from the position determining unit 34. Once the control unit 26 has obtained the position of the device 10, which in this case is the current position of the device, it then investigates the type of service needed which may be done through interrogating the application 28. As an alternative, it is possible that the type of service is provided when the application 28 initially connects to the control unit 26. The application 28 thus informs the control unit 26 of the fact that a document is to be printed. The control unit 26 thereafter generates a service device location request (FIG. 4, 42), which is here provided as a domain name system (DNS) name query, where the name is associated with the desired service and here a request to locate a printer LOC PRINT and also indicating the position of the portable communication device (x, y z). In this way there is also an indication of the type of service desired through specifying that a printer is needed. The control unit 26 then orders the radio communication unit 30 to send the request 42 to the network via the antenna 32 and the wireless access point 14.

The service device locating server 12 is arranged to monitor the network for all such requests that are used to locate different types of service devices and receives this particular request 42 via the communication unit 40. The communication unit 40 forwards the request 42 to the server control unit 36, which in turn looks (FIG. 4, 44) in the table 38 and locates the service device of the type indicated in the request that has a position that is the closest to the position of the portable communication device 10. It does this by comparing the position of the portable communication device 10 with the positions of all the devices that can handle the type of service requested, which is here printing. The server control unit 36 then selects the service device having a position that is the closest to the position of the portable communication device 10 and then generates a response to the request 46 where it gives the name of the closest device of the type in question and also the network identifier, here the IP address, of the device. In the present example the second printer 16 is the closest, so the response (FIG. 4, 46) includes the name PR2 of this printer and also the network address of it 192.168.100.2. Optionally the name may be omitted. The server control unit 36 then orders the communication unit 40 to send the DNS response 46 from the server 12 to the portable communication device 10 via the wireless interface 14. Now the portable communication device 10 can immediately connect to the second printer 16 and send a print request PRINT REQ (FIG. 4, 48) including the document in the form of data DATA for printing the document in question.

In this way it is possible to let a user of the portable communication device 10 to connect to a service device of his need in a simple way and furthermore connect to the one that is closest to him. This saves time and effort for a user of a portable communication device 10, since there is no need for manual entering of information that is necessary for locating and using a device. There is furthermore no need for the user to walk long distances to see the results of the service.

The principles of the invention described above can of course also be applied on other services like for instance streaming of music and/or video. In this case, it is possible that the portable communication device continuously or repeatedly asks for the location of a media rendering device together with its position and gets as a response the one being closest. The portable communication device 10 may then stream the media to the service device indicated by the response. In this way, it is for instance possible to let a user of a portable communication device 10 to have the media follow him as he walks around in a building, It is furthermore possible that the position need not be the current position of the portable communication device. It can also be a future position of which the user of this portable communication device is aware, like for instance a way point such as a location to which he is to travel, maybe his home, work, an airport or some other location. It is then possible that an address of a device is returned that is associated with that position. In this case there is no need for a position determining unit. The network might in this case furthermore be a global network and is thus not limited to a local network. The position might also be provided through for instance pointing on an electronic map.

It is furthermore possible that instead of using a position determining unit, the user of the portable communication device 10 may indicate a room number of the room in which the device is located, whereupon the server 12 locates a device that is closest to or within that room. It is also possible that the portable communication device 10 can receive a list of service devices in that room and the user of the portable communication device may then select a service device from that list.

It is furthermore possible that the server 12 investigates what devices that are capable of providing service that exist within a limited service area around the position of the portable communication device, for instance within a radius of 5, 10 or perhaps 100 meters, and only answers with service devices within that area, perhaps in the form of a list of service devices.

It is furthermore possible that the invention may be provided in a UPnP environment, where a portable communication device may act as a Control Point and sends a service device locating request through sending a search request along with its position. Service devices that are within a limited service area may then answer with their addresses and the type of service they can provide. The portable communication device may then select a service device of the type it wants to use that is closest. It is furthermore possible that the portable communication device provides an object for instance in the form of a type of file that it wants to have a service device treat together with a position and then a service device capable of handling that type of file may be provided as a response to the provision of the file, possibly in a list of several devices that can handle the file and possibly limited to within the service area, whereupon the portable communication device can select rendering device or service device itself. It is furthermore possible that each service device may be provided with the functionality to determine if it is within the service area and then select to respond if it is. Thus there may be several responses to a request, which are gathered and processed by the portable communication device 10. It is thus possible that the portable communication device 10 announces its presence and as a response receives the positions and addresses of service devices in its neighbourhood and then itself selects the one being closest to its position.

The invention may furthermore be used in relation to electronic payments. Then a portable communication device 10 may locate a transaction terminal using the principles mentioned above.

The control unit and application unit in the portable communication device according to the present invention are preferably provided in the form of one or more processors with corresponding memory containing the program code for performing the functions of these units. Normally, the radio communication unit is provided as a separate hardware module, for instance in the form of an application specific integrated circuit (ASIC) circuit. The control unit and the radio communication unit may however be combined in the same module. The different hardware units of the portable communication device may furthermore be connected using a data bus.

In the server 12, the server control unit 36 may likewise be implemented as a processor with corresponding memory comprising program code for performing the selection service devices. The serving device store may be a database and may be provided as one or more memory modules, for instance in form of hard discs and may furthermore be distributed throughout the network. The communication unit may here also be provided in the form of a standard network interface. Also here the server control unit and the communication unit may be combined in the same module.

Figure 5:
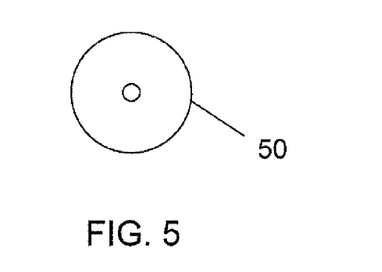
FIG. 5 illustrates a CD ROM disc on which program code for executing a method consistent with the invention may be provided.

The program code mentioned above can also be provided on one or more computer program products such as a CD ROM disc 50 as depicted in FIG. 5, which will perform the function of a control unit or server control unit when loaded into a portable communication device having suitable processing capabilities or when loaded into the server. Naturally other types of products can be provided for this, like for instance a removable memory like a memory stick. The computer program product can also be provided as software, which is downloaded remotely from another server either outside or inside the network.

There are a number of further variations that can be made to the present invention in addition to those already mentioned. It is possible to use other types of position determination than GPS. It is for instance possible to use triangulation in relation to wireless access points. It is possible to use other network identifiers than IP addresses, for instance phone numbers. It is furthermore possible that also the service devices are portable. They may then report their positions to the server, which keeps a dynamic service device location store that is continually updated.

Although the present invention has been described in connection with specific embodiments, it is not intended to be limited to the specific form set forth herein. Rather, the scope of the present invention is limited only by the accompanying claims and their equivalents.

What is claimed is:

1. A method, implemented by a portable communications device, of obtaining a network identifier of a serving device for the portable communication device to obtain a desired service according to a certain type from the serving device, comprising:

sending, from the portable communication device, a service device locating request including a position or location associated with the portable communication device, receiving at least one response including at least one network identifier of a service device capable of handling the desired service, the service device being selected based on its physical proximity to the location of the portable communication device, wherein the at least one response provides more than one network identifier and types of services provided through each network identifier, where each network identifier is associated with a service device that provides a different type of service and is closest to the location of the portable communication device, and selecting network identifier of the service device providing the desired service to be used in contacting this service device.

2. The method according to claim 1, further comprising contacting the service device using the network identifier for obtaining service.

3. The method according to claim 1, wherein the service request includes a type of service indication.

4. The method according to claim 3, wherein the type of service indication is provided through indicating or providing an object to be handled by the service.

5. The method according to claim 3, wherein the type of service indication is provided through naming the desired service.

6. The method according to claim 5, wherein the service request is a name query including the position, where the name of the query is the desired service.

7. The method according to claim 1, wherein a single response provides a list of network identifiers and corresponding services.

8. The method according to claim 1, wherein the location is a current position of the portable communication device.

9. The method according to claim 1, wherein the location is a future expected position of the portable communication device.

10. The method according to claim 1, wherein the service request is sent periodically from the portable communication device.

11. The method according to claim 1, further comprising the step of determining the location associated with the portable communication device to be used for sending a service device locating request.

12. A portable communication device provided for obtaining a network identifier of a serving device for the portable communication device to obtain a desired service according to a certain type from the serving device, comprising:
at least one radio communication unit, and
a control unit configured to:
provide a service device locating request including a position associated with the portable communication device,
order the radio communication unit to send said service device locating request, and,
receive at least one response including at least one network identifier of a service device capable of handling the desired service, the service device being physically closer to the location of the portable communication device than other service devices capable of handling the desired service,
wherein the at least one response provides more than one network identifier and types of services provided through each network identifier, where each network identifier is associated with a service device that provides a different type of service and that is closest to the location of the portable communication device with respect to other service devices, and where the control unit is further configured to select network identifier of the service device providing the desired service to be used in contacting this service device.

13. The portable communication device according to claim 12, wherein said control unit is further configured to order the radio communication unit to contact the service device using the network identifier for obtaining service.

14. The portable communication device according to claim 12, wherein the service request includes a type of service indication.

15. The portable communication device according to claim 14, wherein the type of service indication is provided through indicating or providing an object to be handled by the service.

16. The portable communication device according to claim 14, wherein the type of service indication is provided through naming the desired service.

17. The portable communication device according to claim 16, wherein the service request is a name query including the position and where the name of the query is the desired service.

18. The portable communication device according to claim 12, wherein a single response, of the at least one response,- provides a list of network identifiers and corresponding services.

19. The portable communication device according to claim 12, further comprising a position obtaining unit configured to provide said location associated with the portable communication device to the control unit.

20. The portable communication device according to claim 19, wherein the location is a current position of the portable communication device.

21. The portable communication device according to claim 12, wherein the location is a future expected position of the portable communication device.

22. The portable communication device according to claim 12, wherein the service request is ordered to be sent periodically from the portable communication device.

23. The portable communication device according to claim 12, wherein the portable communication device comprises a cellular phone.

24. A portable communication device provided for obtaining a network identifier of a serving device for the portable communication device in order to obtain a desired service according to a certain type from the serving device, comprising:
means for sending, from the portable communication device, a service device locating request including a position associated with the portable communication device, and
means for receiving at least one response including at least one network identifier of a service device capable of handling the desired service, where the service device is selected based on its physically proximity to the position of the portable communication device,
wherein the at least one response provides more than one network identifier and types of services provided through each network identifier, where each network identifier is associated with a service device that provides a different type of service and that is located closer to the position than other service devices, and further comprising means for selecting network identifier of the service device providing the desired service to be used in contacting this service device.

25. The portable communication device according to claim 24, further comprising means for contacting the service device using the network identifier for obtaining service.

26. The portable communication device according to claim 24, further comprising means for determining the position associated with the portable communication device to be used for sending a service device locating request.

27. A non-transient computer readable medium for storing a computer program code for obtaining a network identifier of a serving device for a portable communication device to obtain a desired service according to a certain type from the serving device, the computer program code for execution by the portable communication device, when said program code is loaded in the portable communication device, to cause the portable communication device to:

provide a service device locating request including a position associated with the portable communication device, order a radio communication unit to send said service device locating request, and, receive at least one response including at least one network identifier of a service device capable of handling the desired service and that is physically closest to the position of the portable communication device, wherein the at least one response provides more than one network identifier and types of services provided through each network identifier, where each network identifier is associated with a service device that provides a different type of service and is closest to the location of the portable communication device, and wherein the program code, when loaded in the portable communication device, further causes the portable communication device to select a network identifier of the service device providing the desired service to be used in contacting this service device.

* * * * *

UNITED STATES PATENT AND TRADEMARK OFFICE
CERTIFICATE OF CORRECTION

PATENT NO.        : 7,945,251 B2
APPLICATION NO.   : 11/424677
DATED             : May 17, 2011
INVENTOR(S)       : Magnus Jendbro et al.

It is certified that error appears in the above-identified patent and that said Letters Patent is hereby corrected as shown below:

Column 12, claim 18 reads "The portable communication device according to claim 12, wherein a single response, of the at least one response, -provides a list of network identifiers and corresponding services.", but should read --The portable communication device according to claim 12, wherein a single response, of the at least one response, provides a list of network identifiers and corresponding services.--

Signed and Sealed this
Fourteenth Day of June, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,945,251 B2 | Page 1 of 1 |
| APPLICATION NO. | : 11/424677 | |
| DATED | : May 17, 2011 | |
| INVENTOR(S) | : Magnus Jendbro et al. | |

It is certified that error appears in the above-identified patent and that said Letters Patent is hereby corrected as shown below:

Column 12, lines 14-17, claim 18 reads "The portable communication device according to claim 12, wherein a single response, of the at least one response, -provides a list of network identifiers and corresponding services.", but should read --The portable communication device according to claim 12, wherein a single response, of the at least one response, provides a list of network identifiers and corresponding services.--

This certificate supersedes the Certificate of Correction issued June 14, 2011.

Signed and Sealed this
Twelfth Day of July, 2011

David J. Kappos
*Director of the United States Patent and Trademark Office*